United States Patent [19]
Diamond

[11] Patent Number: 6,123,977
[45] Date of Patent: Sep. 26, 2000

[54] FOOD SPRAY CONTAINING GRAPE SEED OIL

[75] Inventor: George B. Diamond, Glen Gardner, N.J.

[73] Assignee: Dispensing Container Corp., N.J.

[21] Appl. No.: 09/151,335

[22] Filed: Sep. 11, 1998

Related U.S. Application Data

[60] Provisional application No. 60/059,213, Sep. 18, 1997, and provisional application No. 60/059,249, Sep. 18, 1997.

[51] Int. Cl.$^7$ ..................................................... A23D 9/00
[52] U.S. Cl. ............................ 426/601; 426/609; 426/811
[58] Field of Search ................................... 426/601, 609, 426/811

[56] References Cited

U.S. PATENT DOCUMENTS

| | | | |
|---|---|---|---|
| 3,821,007 | 6/1974 | Carey | 426/609 |
| 3,849,580 | 11/1974 | Sejpal | 426/609 |
| 4,001,391 | 1/1977 | Fernstone | 424/45 |
| 4,108,678 | 8/1978 | Szuhaj | 426/811 |
| 4,127,419 | 11/1978 | Szuhaj | 426/811 |
| 4,188,412 | 2/1980 | Sejpal | 426/609 |
| 4,192,898 | 3/1980 | Hanson | 426/609 |
| 4,371,451 | 2/1983 | Scotti | 426/811 |
| 4,420,496 | 12/1983 | Hanson, Jr. et al. . | |
| 4,504,499 | 3/1985 | Finnan . | |
| 5,374,434 | 12/1994 | Clapp | 426/609 |
| 5,387,431 | 2/1995 | Fuisz . | |
| 5,429,836 | 7/1995 | Fuisz . | |
| 5,455,055 | 10/1995 | Stoltz | 426/811 |
| 5,484,594 | 1/1996 | Frangi et al. . | |
| 5,503,866 | 4/1996 | Wilhelm | 426/609 |
| 5,597,608 | 1/1997 | Fuisz . | |
| 5,612,074 | 3/1997 | Leach . | |
| 5,650,185 | 7/1997 | Stoltz | 426/609 |
| 5,709,876 | 1/1998 | Fuisz . | |

OTHER PUBLICATIONS

Swern 1979 Baileys Industrial Oil and Fat Products vol. 1 4th edition John Wiley & Sons New York pp. 410–412.

Swern 1979 Baileys Industrial Oil and Fat Products vol. 1, 4th edition John Wiley & Sons New York pp. 411–412.

*Primary Examiner*—Carolyn Paden
*Attorney, Agent, or Firm*—Ostrolenk, Faber, Gerb & Soffen, LLP

[57] ABSTRACT

An oil-based food and cooking spray which may be sprayed on food to provide flavoring and/or on cookware to prevent food from sticking to the cookware surfaces which uses grape seed oil as its major ingredient. The grape seed oil imparts a high smoke point and low flammability properties to the spray, and is known to be health enhancing.

12 Claims, No Drawings

FOOD SPRAY CONTAINING GRAPE SEED OIL

This application is based on and claims priority to U.S. Provisional Application No. 60/059,213, filed Sep. 18, 1997 entitled A NOVEL FOOD FLAVOR SPRAY and U.S. Provisional Application No. 60/059,249, filed Sep. 18, 1997, entitled A NOVEL COOKING SPRAY.

FIELD OF THE INVENTION

The present invention relates to a composition used in the preparation of foods provided in the form of a spray. The food spray composition is an oil-based food spray which may be sprayed on food to provide flavoring and/or on cookware to prevent food from sticking to the cookware surfaces.

BACKGROUND OF THE INVENTION

Food flavor sprays, with or without lecithin, are commonly used to add flavor to salads, pastas, fish, meat, etc., and are sprayed directly on the food. Similarly, cooking sprays, with or without flavors, are usually applied to frying pans, baking pans, griddles and similar surfaces in order to prevent food from sticking to the surfaces and therefore make it easier to clean the surfaces and to prevent damage to the food surface such as would occur if parts of the food surface stick to the cookware or utensil surfaces.

Food sprays generally consist of an edible oil and a flavor. In the case of cooking sprays, where a non-stick characteristic is desired, lecithin is also included. A lecithin molecule has a hydrophobic end and a hydrophilic end which prevents the food from sticking to the pan. The oil is usually peanut oil, sesame oil, olive oil, corn oil, canola oil, sunflower oil, soy oil or a mixture of these oils. Examples of flavors added to the oil are butter, garlic, mesquite, etc.

The sprays are commonly dispensed from either an aerosol can or a pump type container. In an aerosol dispenser (by far the most widely-used dispensing system) a propellant is used, such as a hydrocarbon gas, nitrous oxide, carbon dioxide or other food approved propellants. Other additives to prevent foaming are sometimes also used.

The main problem with these conventional sprays is that the oils used have a relatively low smoke point and, when the oil on the cookware surface is heated to a high enough temperature to sear the surface of the food, the sprayed-on oil tends to smoke and fill the kitchen with burnt oil type odors. This is an unpleasant odor and, in addition, can set off smoke alarms used to detect smoke from fires. In restaurants, this odor is especially undesirable for ambience reasons. Thus, it is desired in the art to provide a food flavoring spray and a cooking spray which can be used to add flavor to food and/or to render cookware "non-stick" and which has a high smoke point (preferably at least 245° C.) and low flammability, and in which the oil used is also known to be health enhancing.

SUMMARY OF THE INVENTION

The present invention is a composition and methods for use in the preparation of foods preferably provided in the form of a food spray or a cooking spray that uses grape seed oil as its major ingredient. The grape seed oil comprises from at least about 20% to about 98% by weight of the composition. The composition may additionally include at least one of a flavoring agent, lecithin (from about 1–6%), an edible oil other than grape seed oil, a propellant (up to about 25%), and an antifoaming agent.

Grape seed oil provides the advantages of a high smoke point, low flammability, high polyunsaturated fatty acids, no "trans" fatty acids, very low saturated fatty acids, and a bland flavor which does not interfere with the desired flavors from flavor additives. Additionally, grape seed oil contains bioflavinoids, and with the addition of lecithin, also provides non-stick properties which are desirable in a cookware spray. In addition, grape seed oil has been found to provide many health benefits because of its various constituents.

Other features and advantages of the present invention will become apparent from the following description.

DETAILED DESCRIPTION OF THE PREFERRED EMBODIMENTS

Grape seed oil has the highest content of polyunsaturated fatty acid among the commonly used food oils and has no trans fatty acids no cholesterol, and very low amounts of saturated fatty acids.

The advantage of using grape seed oil in food preparation compositions such as flavor sprays and cooking sprays as compared to other available oils is indicated by its composition as compared to the composition of many other oils. Specifically, grape seed oil has a unique combination of desirable properties:

1) high smoke point;
2) high polyunsaturated fatty acids;
3) no "trans" fatty acids;
4) very low saturated fatty acids;
5) very bland flavor (does not interfere with other flavors);
6) contains bioflavinoids.

The high smoke point of grape seed oil, i.e., 485° F. (250° C.), permits the cookware to be heated to a high enough temperature to sear meats and to blacken fish without generating smoke in quantities to be objectionable.

In view of these advantages, the present invention uses grape seed oil as the carrier oil in a composition of matter used in the preparation of foods. The composition is preferably provided in the form of a spray and may be used as a cooking spray to prevent food from sticking to cookware surfaces or as a food flavor spray to season salads, pastas, fish, meat, bread, and so on. Thus, the grape seed oil serves as the carrier oil for flavor additives in food flavor sprays and for lecithin in cooking sprays.

The following formulas, with added lecithin if desired, are examples of preferred compositions of aerosol type flavor sprays according to the present invention:

EXAMPLE 1

| | |
|---|---|
| grape seed oil (w/w) | 90–97.75% |
| nitrous oxide or carbon dioxide propellant | 2–6% |
| flavor | 0.25–4% |

EXAMPLE 2

| | |
|---|---|
| grape seed oil | 25–35% |
| other edible oils | 62–65% |
| nitrous oxide or | 2–6% |

-continued

| | |
|---|---|
| carbon dioxide propellant | |
| flavor | 0.25–4% |

EXAMPLE 3

| | |
|---|---|
| grape seed oil | 75–87.75% |
| hydrocarbon propellant | 10–25% |
| flavor | 0.25–4% |

EXAMPLE 4

| | |
|---|---|
| grape seed oil | ≈25% |
| other edible oils | 50–62.75% |
| hydrocarbon propellant | 10–25% |
| flavor | 0.25–4% |

(all weight percentages shown are approximate)

Similarly, for cooking sprays according to the present invention, between about 2–6% (w/w) lecithin is added to each of the examples above to provide a non-stick characteristic to the spray. The amount of oil which is in the formulation is reduced by the amount of lecithin added. An anti-foaming agent may further be added to the composition. Suitable antifoaming agents which may be used include an alcohol, silica, siloxane, and licorice extract. Other example formulations of cooking sprays in accordance with the present invention are as follows:

EXAMPLE 5

| | |
|---|---|
| grape seed oil | 85–94% |
| nitrous oxide or carbon dioxide propellant | 3–7% |
| lecithin | 3–6% |
| flavors | 0–1% |
| antifoam | 0–1% |

EXAMPLE 6

| | |
|---|---|
| grape seed oil | 67–82% |
| hydrocarbon propellant | 10–25% |
| lecithin | 3–6% |
| flavors | 0–1% |
| antifoam | 0–1% |

EXAMPLE 7

| | |
|---|---|
| grape seed oil | 68–82% |
| lecithin | 3–6% |
| nitrous oxide or carbon dioxide propellant | 3–7% |
| ethanol for defoaming | 12–18% |

-continued

| | |
|---|---|
| flavor | 0–1% |
| other antifoam | 0–1% |

(all weight percentages shown are approximate)

In each of Examples 5–7, other oils may be mixed with grape seed oil, whereupon the smoke point is lowered to an intermediate level which may be useful for certain purposes. In such cases, the grape seed oil comprises at least about 25% (w/w) of the oil mixture.

To provide an extra fine mist, about 1–5% of high pressure hydrocarbon may be added to the nitrous oxide or carbon dioxide propellant while decreasing the oil component by the same amount in each of Examples 1–8 shown above. This small amount of hydrocarbon does not substantially increase the flammability of the spray. Moreover, even a hydrocarbon propellant content in the 10–25% range, while rendering the spray more flammable, is still acceptable under various U.S.A. government regulations, if the label has a "flamable" warning.

When the spray is to be delivered in a pump spray type dispensing system, the propellant may be omitted from each of the above formulations while increasing the other contents by an equivalent amount.

A partial listing of some of the ingredients which may be included in the food flavoring and cooking sprays of the present invention is presented below, along with the function served by each of the listed ingredients.

grape seed oil . . . carrier, high smoke point
lecithin . . . anti-stick
nitrous oxide . . . propellant, non-flammable
carbon dioxide . . . propellant, non-flammable
hydrocarbon . . . propellant, for misting
alcohol . . . antifoam
silica . . . antifoam
a siloxane . . . antifoam
licorice extract . . . antifoam
a non-propellant hydrocarbon . . . antifoam Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A composition in a sprayable form for use in the preparation of foods comprising grape seed oil, at least one flavoring agent and a propellant selected from the group consisting of nitrous oxide and carbon dioxide, said composition not having any alcohol.

2. The composition of claim 1, wherein the grape seed oil comprises at least about 20% by weight of the composition.

3. The composition of claim 1, wherein the grape seed oil comprises at least about 60% by weight of the composition.

4. The composition of claim 1, wherein the grape seed oil comprises at least about 75% to about 98% by weight of the composition.

5. The composition of claim 1, further comprising at least about 1% by weight of lecithin.

6. The composition of claim 1, further comprising between about 3% to about 6% by weight of lecithin.

7. The composition of claim 1, further comprising at least one edible oil other than grape seed oil.

8. The composition of claim 1, wherein the propellant comprises between about 1% to 25% by weight of the composition.

9. The composition of claim 1, wherein the propellant comprises between about 1% to about 10% by weight of the composition.

10. The composition of claim 1, wherein the propellant is a food grade propellant.

11. The composition of claim 1, further comprising at least one food grade antifoaming agent.

12. The composition of claim 1 having a smoke point of at least about 245° C.

* * * * *

UNITED STATES PATENT AND TRADEMARK OFFICE
CERTIFICATE OF CORRECTION

PATENT NO. : 6,123,977  
DATED : September 26, 2000  
INVENTOR(S) : George B. Diamond Page 1 of 1

It is certified that error appears in the above-identified patent and that said Letters Patent is hereby corrected as shown below:

Title page,
Item [73], Dispensing Containers Corporation

Signed and Sealed this

Fifth Day of March, 2002

*Attest:*

JAMES E. ROGAN
*Attesting Officer*  *Director of the United States Patent and Trademark Office*